No. 866,104. PATENTED SEPT. 17, 1907.
W. W. WHITE.
TRANSMITTING MECHANISM FOR TURBINE WATER WHEELS.
APPLICATION FILED JAN. 14, 1905.

Witnesses
Roy D. Tolman.
Penelope Comberbach.

Inventor
William W. White
By Rufus B. Fowler
Attorney

UNITED STATES PATENT OFFICE.

WILLIAM W. WHITE, OF WORCESTER, MASSACHUSETTS.

TRANSMITTING MECHANISM FOR TURBINE WATER-WHEELS.

No. 866,104.   Specification of Letters Patent.   Patented Sept. 17, 1907.

Application filed January 14, 1905. Serial No. 241,016.

*To all whom it may concern:*

Be it known that I, WILLIAM W. WHITE, a citizen of the United States, residing at Worcester, in the county of Worcester and Commonwealth of Massachusetts, have invented a new and useful Improvement in Transmitting Mechanism for Turbine Water-Wheels, of which the following is a specification, accompanied by drawings forming a part of the same, in which—

Figure 1:
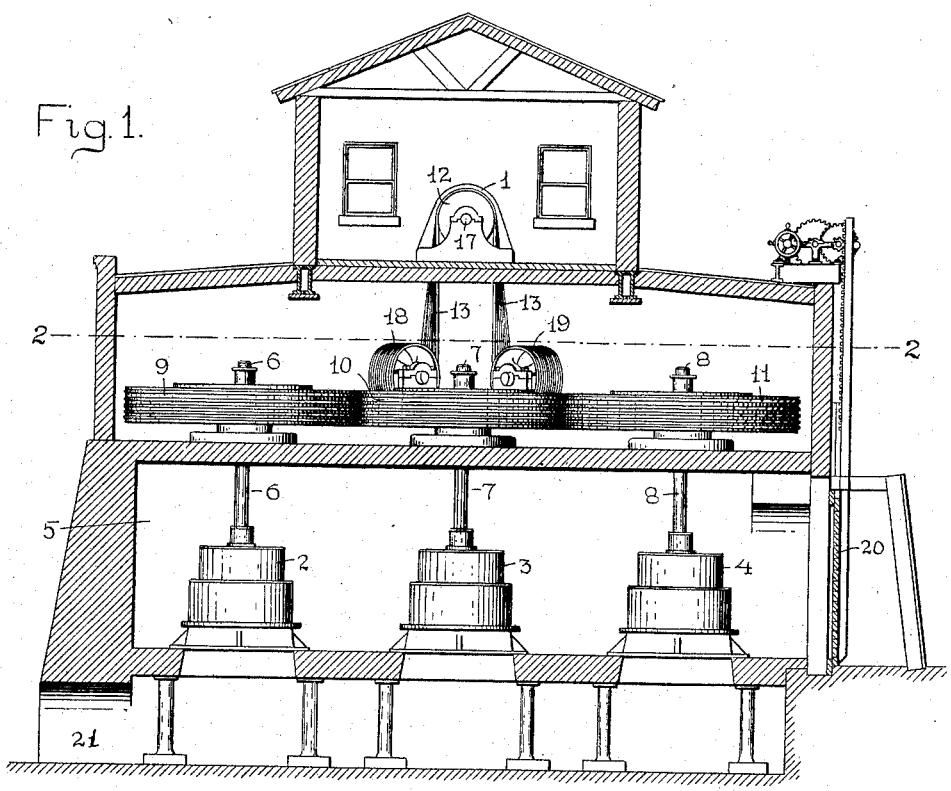
Figure 2:
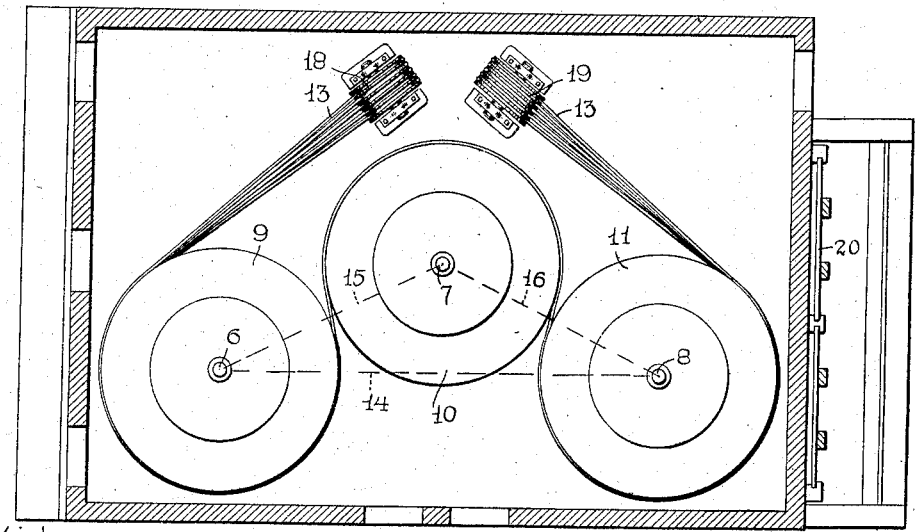

Figure 1 represents a vertical sectional view of a power house, showing my improved system of transmitting power in elevation, and Fig. 2 is a plan view shown in sectional view on line 2—2, Fig. 1.

Similar reference letters and figures refer to similar parts in the different views.

The object of my present invention is to provide an effective means for transmitting power from turbine water wheels adapted for driving electric dynamos which require to be run at a high rate of uniform speed and with a consumption of considerable power, and I accomplish this object by means of three or more turbines placed in a common wheel pit, having vertical shafts placed out of alinement and carrying upon their upper ends scored drums provided with wrapping connections with the dynamo to be driven by a common endless cable.

In the accompanying drawings I have represented a dynamo 1 as driven from three turbines 2, 3 and 4 arranged in a common wheel pit 5 and having vertical shafts 6, 7 and 8, placed out of alinement and carrying upon their upper ends the scored drums 9, 10 and 11 connected with the driven pulley 12 of the dynamo by an endless cable 13 composed of multiple strands one of which is wrapped around the pulley 12 and drums 9, 10 and 11 in each of their grooves, in the present instance five in number. The turbines 2, 3 and 4 are arranged in the wheel pit so that their axes will coincide with the angles of an isosceles triangle represented in Fig. 2 by the broken lines 14, 15 and 16, the shafts 6 and 8 being placed at opposite ends of the base line 14 of the triangle, and the shaft 7 being placed at the apex of the triangle. The scored drums 9, 10 and 11 are of equal diameter and the axis of the drum 10 is placed at the requisite distance from the base line 14 of the triangle to secure the desired clearance between the periphery of the drum 10 and the peripheries of the drums 9 and 11. The cable 13 is wrapped around the pulley 12 on the horizontal shaft 17 of the dynamo and is carried vertically downward beneath the scored idler pulleys 18 and 19 to the outer sides of the drums 9 and 11 and between the drums 9 and 11 and the drum 10 around the side of the drum 10 opposite the base line of the triangle.

Water is admitted through a gate 20 to the wheel pit 5 and passing through the turbines 2, 3 and 4 is discharged through a common tail-race 21 driving the turbines at a uniform speed which is communicated through the cable 13 to the pulley 12 of the dynamo.

By the arrangement of the driving drums 9, 10 and 11 the wrapping connection is made to inclose considerable more than half of the periphery of each drum, thereby obviating the liability of the slipping of the cable in the grooves of the drums and enabling the power of the turbines to be transmitted to the dynamo without any material diminution, and the operation of the power transmitting apparatus is practically noiseless and is not subject to deterioration due to excessive wear of the driving parts as the slipping of the cables upon the scored drums is obviated.

By the apparatus above described the entire power of the three turbines is uniformly transmitted with a minimum amount of loss to the driven machine.

What I claim as my invention and desire to secure by Letters Patent is:—

The combination of a series of turbine water wheels, having vertical shafts placed out of alinement, the shafts of two wheels being placed at the opposite ends of the base line of a triangle and the shaft of a third wheel being placed at the apex of the triangle, a gate admitting a water supply in common to all of said water wheels, scored driving pulleys attached to the upper ends of said water wheel shafts and in the same horizontal plane, a scored drum pulley having a horizontal shaft, a wrapping connection between said driving pulleys and said driven pulley, and intermediate pulleys for changing the direction of said wrapping connection.

WILLIAM W. WHITE.

Witnesses:
RUFUS B. FOWLER,
PENELOPE COMBERBACH.